US008691911B2

(12) United States Patent
Doshi et al.

(10) Patent No.: US 8,691,911 B2
(45) Date of Patent: Apr. 8, 2014

(54) MELT-BLENDED THERMOPLASTIC COMPOSITION

(75) Inventors: Shailesh Ratilal Doshi, Kingston (CA); Anna Kutty Mathew, Kingston (CA)

(73) Assignee: E I du Pont de Nemours and Company, Wilmington, DE (US)

( * ) Notice: Subject to any disclaimer, the term of this patent is extended or adjusted under 35 U.S.C. 154(b) by 95 days.

(21) Appl. No.: 13/357,991

(22) Filed: Jan. 25, 2012

(65) Prior Publication Data

US 2012/0196973 A1    Aug. 2, 2012

Related U.S. Application Data

(60) Provisional application No. 61/437,840, filed on Jan. 31, 2011.

(51) Int. Cl.
*C08G 69/26*    (2006.01)

(52) U.S. Cl.
USPC ......................................... 524/538; 525/432

(58) Field of Classification Search
USPC .......................................... 524/538; 525/432
See application file for complete search history.

(56) References Cited

U.S. PATENT DOCUMENTS

| 4,174,358 A | 11/1979 | Epstein |
| 4,180,529 A | 12/1979 | Hofmann |
| 7,348,046 B2 | 3/2008 | Liedloff et al. |
| 2003/0023008 A1 | 1/2003 | Uchida et al. |
| 2010/0029819 A1 | 2/2010 | Palmer et al. |
| 2010/0233402 A1 | 9/2010 | Doshi et al. |
| 2010/0249282 A1 | 9/2010 | Topoulos |
| 2011/0144256 A1 | 6/2011 | Mathew et al. |
| 2012/0108124 A1 | 5/2012 | Elia et al. |

OTHER PUBLICATIONS

International Search Report PCT/US201223/023276, Sep. 12, 2012.
Non-final Office Action U.S. Appl. No. 13/636,343, filed Oct. 22, 2012, Notification date Sep. 25, 2013.

*Primary Examiner* — Edward Cain

(57) ABSTRACT

Disclosed is a melt-blended thermoplastic composition including: A) a polyamide composition including a) 55 to 90 weight percent semi-crystalline semi-aromatic copolyamide; wherein the semi-aromatic copolyamide has a DMA tan delta peak value of greater than or equal to 0.23; and heat of fusion of at least 20 J/g and b) 10 to 45 weight percent aliphatic homopolyamide; wherein the aliphatic homopolyamide has a DMA tan delta peak value of less than or equal to 0.21; and heat of fusion of at least 30 J/g; B) 0 to 45 weight percent polymeric toughener; C) 0 to 20 weight percent plasticizer; and D) 0 to 45 weight percent reinforcing agent; wherein said melt-blend composition has a glass transition and has a tan delta peak (E"/E') value of 0.21 or lower at said glass transition. Further disclosed herein is a method for providing the melt-blended thermoplastic composition.

12 Claims, 1 Drawing Sheet

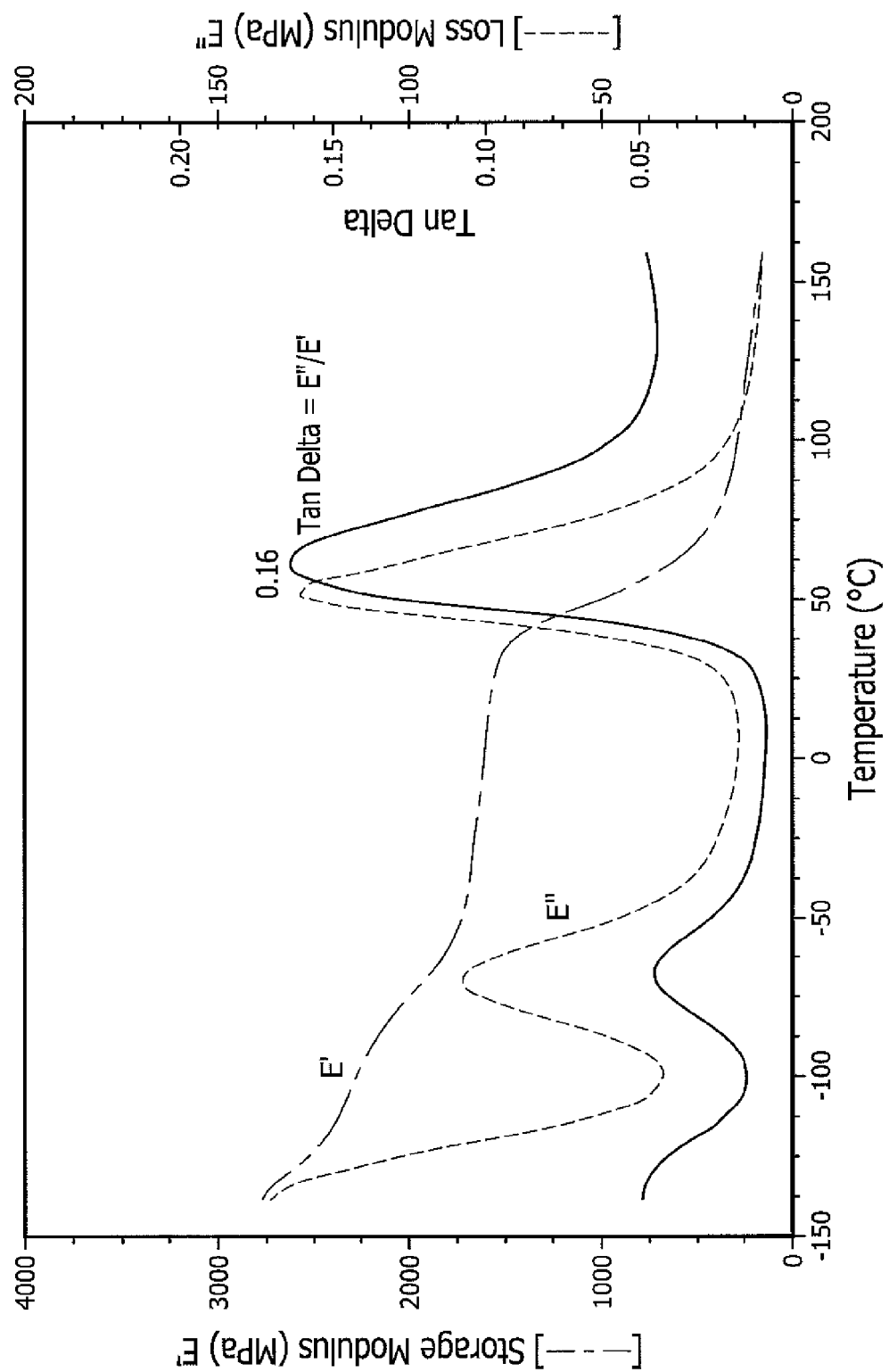

MELT-BLENDED THERMOPLASTIC COMPOSITION

This application claims the benefit of priority to Application No. 61/437,840, filed Jan. 31, 2011.

FIELD OF INVENTION

The present invention relates to the field of polyamide compositions having improved properties at elevated temperature.

BACKGROUND OF INVENTION

Thermoplastic polymeric materials are used extensively in automotive vehicles and for other purposes. They are light and relatively easy to fashion into complex parts, and are therefore preferred instead of metals in many instances. However a problem with some metal alloys and some polymers is salt stress (induced) corrosion cracking (SSCC), where a part under stress undergoes accelerated corrosion when under stress and in contact with inorganic salts. This often results in cracking and premature failure of the part.

US Patent Publication 2010/0233402 entitled "Salt Resistant Polyamide Compositions" discloses certain semi-aromatic copolyamides that exhibit improved chemical resistance especially to metal halides and salts compared to corresponding aliphatic homopolyamides. In these copolyamides, at least 15 mole percent of the repeat units are derived from monomers that comprise an aromatic structure. Thus, semi-aromatic copolyamides 612/6T comprising 20 to 30 mole percent 6T units exhibit improved salt resistance than corresponding homopolyamide PA 612.

The presence of two or more types of repeat units in a copolyamide, however, has a negative consequence. These copolyamides have reduced degree of crystallinity. As a result they exhibit inferior high temperature properties compared to the corresponding homopolyamides. These properties include such mechanical properties as stiffness, strength and creep resistance at high temperature that are important in many of their end-uses. As the aromatic repeat unit content increases to approach 50 mole percent, the polymer becomes increasingly amorphous, and correspondingly exhibits greater loss in high temperature properties.

When molar aromatic repeat unit content exceeds 55 percent as in case of polyphthalamides, the copolyamide is able to develop crystallinity and exhibit improved high temperature properties. However, these copolyamides have very high melting points often exceeding 300° C. They are less desirable for applications requiring extrusion processing such as hose and tubes, cable covering and filaments. For these applications, it is desirable to have polyamides that exhibit melting points below about 290° C.

The salt resistance and high temperature mechanical properties are thus two conflicting aspects influenced by the aromatic repeat unit content of the semi-aromatic copolyamides. It is desirable to develop semi-aromatic copolyamide formulations that simultaneously exhibit good salt resistance and high temperature properties, and are processable at temperature below 300° C.

SUMMARY OF INVENTION

Disclosed herein is a melt-blended thermoplastic composition comprising
A) a polyamide composition comprising
 a) 55 to 90 weight percent semi-crystalline semi-aromatic copolyamide having a melting point; wherein said semi-aromatic copolyamide comprises
  a-1) about 15 to 50 mole percent aromatic repeat units derived from:
   i) one or more aromatic dicarboxylic acids with 8 to 20 carbon atoms and a first aliphatic diamine with 4 to 20 carbon atoms;
   and
  a-2) 50 to 85 mole percent aliphatic repeat units derived from:
   ii) a first aliphatic dicarboxylic acid with 8 to 20 carbon atoms and said first aliphatic diamine with 4 to 20 carbon atoms; or
   iii) a first aliphatic aminoacid or lactam with 8 to 20 carbon atoms;
   wherein the semi-aromatic copolyamide has a DMA tan delta peak value of greater than or equal to 0.23; and heal of fusion of at least 20 J/g as measured in first heat cycle of DSC;
 b) 10 to 45 weight percent aliphatic homopolyamide having a melting point; wherein said aliphatic homopolyamide comprises repeat units derived from:
  iv) a second aliphatic dicarboxylic acid with 8 to 20 carbon atoms and a second aliphatic diamine with 4 to 20 carbon atoms or
  v) a second aliphatic aminoacid or lactam with 8 to 20 carbon atoms; and wherein the aliphatic homopolyamide has a DMA tan delta peak value of less than or equal to 0.21; and heat of fusion of at least 30 J/g as measured in first heat cycle of DSC;
 wherein the weight percent of a) and b) are based on the total weight of a) and b); and said first and second aliphatic diamines can be the same or different.
B) 0 to 45 weight percent polymeric toughener;
C) 0 to 20 weight percent, preferably 0 to 12 weight percent, plasticizers; and
D) 0 to 45 weight percent reinforcing agent;
wherein the weight percent of B), C), and D) are based on the total weight of the melt-blended thermoplastic composition; the melt-blending is performed at a melt temperature above the melting point of said semi-crystalline semi-aromatic copolyamide and said aliphatic homopolyamide and less than or equal to about 290° C., and preferably less than or equal to 280° C., to provide said melt-blended thermoplastic composition; and wherein said melt-blend composition has a glass transition and has a tan delta peak (E"/E') value of 0.21 or lower at said glass transition.

Further disclosed herein is a method for providing a melt-blended thermoplastic composition comprising: melt-blending components A) to D) as disclosed above, wherein the weight percent of B), C), and D) are based on the total weight of the melt-blended thermoplastic composition; and wherein said melt-blend composition has a glass transition and has a tan delta peak (E"/E') value of 0.21 or lower at said glass transition.

BRIEF DESCRIPTION OF FIGURES

FIG. 1 shows a dynamic mechanical analysis of a semi-crystalline copolymer.

DETAILED DESCRIPTION

Herein melting points are as determined with differential scanning calorimetry (DSC) at a scan rate of 10° C./min in the first heating scan, wherein the melting point is taken at the maximum of the endothermic peak, and the heat of fusion in Joules/gram (J/g) is the area within the endothermic peak.

Dynamic mechanical analysis (DMA) is used herein for determination of storage modulus (E') and loss modulus (E"), and glass transition, as a function of temperature. Tan delta is a curve resulting from the loss modulus divided by the storage modulus (E"/E') as a function of temperature.

Dynamic mechanical analysis is discussed in detail in "Dynamic Mechanical Analysis: A practical Introduction," Menard K. P., CRC Press (2008) ISBN is 978-1-4200-5312-8. Storage modulus (E'), loss modulus (E") curves exhibit specific changes in response to molecular transitions occurring in the polymeric material in response to increasing temperature. A key transition is called glass transition. It characterizes a temperature range over which the amorphous phase of the polymer transitions from glassy to rubbery state, and exhibits large scale molecular motion. Glass transition temperature is thus a specific attribute of a polymeric material and its morphological structure. For the melt-blended polyamide compositions disclosed herein, the glass transition occurs over a temperature range of about 10 to about 90° C. The Tan delta curve exhibits a prominent peak in this temperature range. This peak tan delta temperature is defined in the art as the tan delta glass transition temperature, and the height of the peak is a measure of the crystallinity of the polymeric material. A polymeric sample with low or no crystallinity exhibits a tall tan delta peak due to large contribution of the amorphous phase molecular motion, while a sample with high level of crystallinity exhibits a smaller peak because molecules in crystalline phase are not able to exhibit such large scale rubbery motion. Thus, herein the value of tan delta glass transition peak is used as a comparative indicator of level of crystallinity in the melt-blended thermoplastic polyamide composition.

FIG. 1 shows a dynamic mechanical analysis of a crystalline copolymer showing the storage modulus (E'), loss modulus (E") curves and computed tan delta curve (E"/E'). A higher tan delta peak corresponds to lower crystallinity and conversely, a lower tan delta peak corresponds to higher crystallinity: as discussed in "Thermal Analysis of Polymers," Sepe M. P., Rapra Review Reports, Vol. 8, No. 11 (1977).

Polyamides disclosed herein are homopolymers or copolymers wherein the term copolymer refers to polyamides that have two or more amide and/or diamide molecular repeat units. The homopolymers and copolymers are identified by their respective repeat units. For copolymers disclosed herein, the repeat units are listed in decreasing order of mole % repeat units present in the copolymer. The following list exemplifies the abbreviations used to identify monomers and repeat units in the homopolymer and copolymer polyamides (PA):

| HMD | hexamethylene diamine (or 6 when used in combination with a diacid) |
|---|---|
| T | Terephthalic acid |
| AA | Adipic acid |
| DMD | Decamethylenediamine |
| 6 | ϵ-Caprolactam |
| DDA | Decanedioic acid |
| DDDA | Dodecanedioic acid |
| I | Isophthalic acid |
| MXD | meta-xylylene diamine |
| TMD | 1,4-tetramethylene diamine |
| 4T | polymer repeat unit formed from TMD and T |
| 6T | polymer repeat unit formed from HMD and T |
| DT | polymer repeat unit formed from 2-MPMD and T |
| MXD6 | polymer repeat unit formed from MXD and AA |
| 66 | polymer repeat unit formed from HMD and AA |
| 10T | polymer repeat unit formed from DMD and T |
| 410 | polymer repeat unit formed from TMD and DDA |
| 510 | polymer repeat unit formed from 1,5-pentanediamine and DDA |
| 610 | polymer repeat unit formed from HMD and DDA |
| 612 | polymer repeat unit formed from HMD and DDDA |
| 6 | polymer repeat unit formed from ϵ-caprolactam |
| 11 | polymer repeat unit formed from 11-aminoundecanoic acid |
| 12 | polymer repeat unit formed from 12-aminododecanoic acid |

Note that in the art the term "6" when used alone designates a polymer repeat unit formed from ϵ -caprolactam. Alternatively "6" when used in combination with a diacid such as T, for instance 6T, the "6" refers to HMD. In repeat units comprising a diamine and diacid, the diamine is designated first. Furthermore, when "6" is used in combination with a diamine, for instance 66, the first "6" refers to the diamine HMD, and the second "6" refers to adipic acid. Likewise, repeat units derived from other amino acids or lactams are designated as single numbers designating the number of carbon atoms.

Copolymer repeat units are separated by a slash (that is, /). For instance poly(decamethylene decanediamide/decamethylene terephthalamide) is abbreviated PA1010/10T (75/25), and the values in brackets are the mole % repeat unit of each repeat unit in the copolymer.

Semi-crystalline semi-aromatic copolyamides useful in the melt-blended thermoplastic composition comprise a-1) about 15 to 50 mole percent, and preferably 15 to 40 mole percent, aromatic repeat units derived from:
   i) one or more aromatic dicarboxylic acids with 8 to 20 carbon atoms and a first aliphatic diamine with 4 to 20 carbon atoms; and a-2) 50 to 85 mole percent, preferably 60 to 85 mole percent, aliphatic repeat units derived from:
   ii) a first aliphatic dicarboxylic acid with 8 to 20 carbon atoms and said first aliphatic diamine with 4 to 20 carbon atoms; or
   iii) an aliphatic aminoacid or a lactam with 8 to 20 carbon atoms;

wherein the semi-aromatic copolyamide has a DMA tan delta peak value of greater than or equal to 0.23; and heat of fusion of at least 20 J/g as measured in first heat cycle of DSC.

The aromatic dicarboxylic acid with 8 to 20 carbon atoms include terephthalic acid, isophthalic acid, and 2,6-napthalenedioic acid. Terephthalic acid and isophthalic acid are preferred.

The first aliphatic dicarboxylic acid with 8 to 20 carbon atoms may include decanedioic acid, dodecanedioic acid, tridecanedioic acid, tetradecanedioic acid, hexadecanedioic acid, octadecanedioic acid. Dodecanedioic acid and decanedioic acid are preferred aliphatic dicarboxylic acids.

The first aliphatic diamine with 4 to 20 carbon atoms may have 4 to 12 carbon atoms; and more preferably are selected from the group consisting of hexamethylenediamine (HMD), 1,10-decanediamine, 1,12-dodecanediamine, and 2-methyl-1,5-pentamentylenediamine.

The aliphatic aminoacid or lactam with 8 to 20 carbon atoms may be 11-aminoundecanoic acid, 12-aminododecanoic acid or their respective lactams. Semi-crystalline semi-aromatic copolyamides useful in the melt-blended thermoplastic compositions include those selected from the group consisting of: PA 612/6T (85/15) to (55/45), and preferably PA 612/6T (75/25), PA 612/6T (70/30) and PA 612/6T (60/40); PA 610/6T (85/15) to (55/45) and preferably PA 610/6T (80/20), PA 610/6T (75/25) and PA 610/6T (60/40); PA1010/10 (85/15) to (55/45), and preferably PA 1010/10T (80/20); PA 612/6I (90/10) to (70/30), and preferably PA 612/6I (85/15); and PA 612/6T/6I having a mole percent of 6T+6I of from 15 to 45 mol percent and the ratio of T to I is about 4:1 to 1:1, and preferably PA 612/6T/6I 80/10/10 and (75/20/5).

Aliphatic homopolyamides useful in the melt-blended thermoplastic composition comprise repeal units derived from:
iv) a second aliphatic dicarboxylic acid with 8 to 20 carbon atoms and a second aliphatic diamine with 4 to 20 carbon atoms or
v) a second aliphatic aminoacid or lactam with 8 to 20 carbon atoms;
wherein the aliphatic homopolyamide has a DMA tan delta peak value of less than or equal to 0.21; and a heat of fusion of at least 30 J/g in first heat cycle as measured with DSC.

The second aliphatic dicarboxylic acid with 8 to 20 carbon atoms may be the same as disclosed above for the first aliphatic dicarboxylic acid. The second aliphatic diamine with 6 to 20 carbon atoms may be the same as disclosed above for the first aliphatic diamine. The second aliphatic aminoacid or lactam with 8 to 20 carbon atoms may be the same as disclosed above for the first aliphatic aminoacid or lactam. Preferred second aliphatic diamines are HMD, decanediamine, and dodecanediamine.

Preferably the second aliphatic dicarboxylic acid, the second aliphatic diamine, and/or the second aliphatic aminoacid or lactam present in the aliphatic homopolyamide are the same as the first aliphatic dicarboxylic acid, the first aliphatic diamine, and the first aliphatic aminoacid or lactam, present in the semi-crystalline semi-aromatic copolyamide.

Aliphatic homopolyamides useful in the melt-blended thermoplastic composition include PA 612, PA 610, PA1010, and PA 614.

The melt-blended thermoplastic composition may be wherein the A) polyamide composition is selected from the group consisting of those listed in Table 1.

TABLE 1

Preferred combinations of semiaromatic polyamide and aliphatic homopolyamide.

| Semi-aromatic polyamide | Aliphatic homopolyamide[a] |
|---|---|
| PA 612/6T (85/15) to (55/45) including compositions: 60 to 80 wt % PA 612/6T (75/25) 70 wt % PA 612/6T (75/25) 60 to 80 weight percent PA 612/6T (70/30) 65 weight percent PA 612/6T (70/30) | PA 612 |
| PA 610/6T (85/15) to (55/45) including compositions: 60 to 80 wt % PA 610/6T (80/20) 75 wt % PA 610/6T (80/20) | PA 610 |
| PA 610/6T (85/15) to (55/45) including compositions: 60 to 80 wt % PA 610/6T (80/20) 75 wt % PA 610/6T (80/20) 60 to 75 wt % PA 610/6T (60/40) 75 wt % PA 610/6T (60/40) | PA 1010 |

[a]wt % of aliphatic homopolyamide is 100% minus the stated wt % of semi-aromatic polyamide.

The polymeric toughener is a polymer, typically an elastomer having a melting point and/or glass transition points below 25° C., or is rubber-like, i.e., has a heat of melting (measured by ASTM Method D3418-82) of less than about 10 J/g, more preferably less than about 5 J/g, and/or has a melting point of less than 80° C., more preferably less than about 60° C. Preferably the polymeric toughener has a weight average molecular weight of about 5,000 or more, more preferably about 10,000 or more, when measured by gel permeation chromatography using polyethylene standards.

The polymeric toughener can be a functionalized toughener, a nonfunctionalized toughener, or blend of the two.

A functionalized toughener has attached to it reactive functional groups which can react with the polyamide. Such functional groups are usually "attached" to the polymeric toughener by grafting small molecules onto an already existing polymer or by copolymerizing a monomer containing the desired functional group when the polymeric tougher molecules are made by copolymerization. As an example of grafting, maleic anhydride may be grafted onto a hydrocarbon rubber (such as an ethylene/α-olefin copolymer, an α-olefin being a straight chain olefin with a terminal double bond such a propylene or 1-octene) using free radical grafting techniques. The resulting grafted polymer has carboxylic anhydride and/or carboxyl groups attached to it.

Ethylene copolymers are an example of a polymeric toughening agent wherein the functional groups are copolymerized into the polymer, for instance, a copolymer of ethylene and a (meth)acrylate monomer containing the appropriate functional group. Herein the term (meth)acrylate means the compound may be either an acrylate, a methacrylate, or a mixture of the two. Useful (meth)acrylate functional compounds include (meth)acrylic acid, 2-hydroxyethyl(meth)acrylate, glycidyl(meth)acrylate, and 2-isocyanatoethyl(meth)acrylate. In addition to ethylene and a functionalized (meth)acrylate monomer, other monomers may be copolymerized into such a polymer, such as vinyl acetate, unfunctionalized (meth)acrylate esters such as ethyl(meth)acrylate, n-butyl (meth)acrylate, i-butyl (meth)acrylate and cyclohexyl(meth) acrylate. Polymeric tougheners include those listed in U.S. Pat. No. 4,174,358, which is hereby incorporated by reference.

Another functionalized toughener is a polymer having carboxylic acid metal salts. Such polymers may be made by grafting or by copolymerizing a carboxyl or carboxylic anhydride containing compound to attach it to the polymer. Useful materials of this sort include Surlyn® ionomers available from E. I. DuPont de Nemours & Co. Inc., Wilmington, Del. 19898 USA, and the metal neutralized maleic anhydride grafted ethylene/et-olefin polymer described above. Preferred metal cations for these carboxylate salts include Zn, Li, Mg and Mn.

Polymeric tougheners useful in the invention include those selected from the group consisting of linear low density polyethylene (LLDPE) or linear low density polyethylene grafted with an unsaturated carboxylic anhydride, ethylene copolymers; ethylene/α-olefin or ethylene/α-olefin/diene copolymer grafted with an unsaturated carboxylic anhydride; core-shell polymers, and nonfunctionalized tougheners, as defined herein.

Herein the term ethylene copolymers include ethylene terpolymers and ethylene multi-polymers, i.e. having greater than three different repeat units. Ethylene copolymers useful as polymeric tougheners in the invention include those selected from the group consisting of ethylene copolymers of the formula E/X/Y wherein:
E is the radical formed from ethylene;
X is selected from the group consisting of radicals formed from

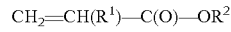

wherein $R^1$ is H, $CH_3$ or $C_2H_5$, and $R^2$ is an alkyl group having 1-8 carbon atoms; vinyl acetate; and mixtures thereof; wherein X comprises 0 to 50 weight % of E/X/Y copolymer;

Y is one or more radicals formed from monomers selected from the group consisting of carbon monoxide, sulfur dioxide, acrylonitrile, maleic anhydride, maleic acid diesters, (meth)acrylic acid, maleic acid, maleic acid monoesters, itaconic acid, fumaric acid, fumaric acid monoesters and potassium, sodium and zinc salts of said preceding acids, glycidyl (meth)acrylate, 2-hydroxyethyl (meth)acrylate, 2-isocyanatoethyl(meth)acrylate and glycidyl vinyl ether; wherein Y is from 0.5 to 35 weight % of the E/X/Y copolymer, and preferably 0.5-20 weight percent of the E/X/Y copolymer, and E is the remainder weight percent and preferably comprises 40-90 weight percent of the E/X/Y copolymer.

It is preferred that the functionalized toughener contain a minimum of about 0.5, more preferably 1.0, very preferably about 2.5 weight percent of repeat units and/or grafted molecules containing functional groups or carboxylate salts (including the metal), and a maximum of about 15, more preferably about 13, and very preferably about 10 weight percent of monomers containing functional groups or carboxylate salts (including the metal). It is to be understood than any preferred minimum amount may be combined with any preferred maximum amount to form a preferred range. There may be more than one type of functional monomer present in the polymeric toughener, and/or more than one polymeric toughener. In one embodiment the polymeric toughener comprises about 2.5 to about 10 weight percent of repeat units and/or grafted molecules containing functional groups or carboxylate salts (including the metal).

It has been found that often the toughness of the composition is increased by increasing the amount of functionalized toughener and/or the amount of functional groups and/or metal carboxylate groups. However, these amounts should preferably not be increased to the point that the composition may crosslink (thermoset), especially before the final part shape is attained, and/or the first to melt tougheners may crosslink each other. Increasing these amounts may also increase the melt viscosity, and the melt viscosity should also preferably not be increased so much that molding is made difficult.

Nonfunctionalized tougheners may also be present in addition to a functionalized toughener. Nonfunctionalized tougheners include polymers such as ethylene/α-olefin/diene (EPDM) rubber, polyolefins including polyethylene (PE) and polypropylene, and ethylene/α-olefin (EP) rubbers such as ethylene/1-octene copolymer, and the like such as those commercial copolymers under the ENGAGE® brand from Dow Chemical, Midland Mich. Other nonfunctional tougheners include the styrene—containing polymers including acrylonitrile styrene copolymer, acrylonitrile-butadiene-styrene copolymer, styrene-isoprene-styrene copolymer, styrene-hydrogenated isoprene-styrene copolymer, styrene-butadiene-styrene copolymer, styrene-hydrogenated butadiene-styrene copolymer, styrenic block copolymer, (are not the above listed polymers block or random polymers?) polystyrene. For example, acrylonitrile-butadiene-styrene, or ABS, is a terpolymer made by polymerizing styrene and acrylonitrile in the presence of polybutadiene. The proportions can vary from 15 to 35% acrylonitrile, 5 to 30% butadiene and 40 to 60% styrene. The result is a long chain of polybutadiene crisscrossed with shorter chains of polystyrene acrylonitrile).

Other polymeric tougheners useful in the invention are having a (vinyl aromatic comonomer) core comprising an ethylene copolymer as disclosed above, the core optionally cross-linked and optionally containing a vinyl aromatic comonomer, for instance styrene; and a shell comprising another polymer that may include polymethyl methacrylate and optionally contain functional groups including epoxy, or amine. The core-shell polymer may be made up of multiple layers, prepared by a multi-stage, sequential polymerization technique of the type described in U.S. Pat. No. 4,180,529. Each successive stage is polymerized in the presence of the previously polymerized stages. Thus, each layer is polymerized as a layer on top of the immediately preceding stage.

When used, the minimum amount of polymeric toughener is 0.5, preferably 6, and more preferably about 8 weight percent of the melt-blended thermoplastic composition, while the maximum amount of polymeric toughener is about 45 weight percent, preferably about 40 weight percent. It is to be understood than any minimum amount may be combined with any maximum amount to form a preferred weight range.

Useful polymeric tougheners include:
(a) A copolymer of ethylene, glycidyl(meth)acrylate, and optionally one or more (meth)acrylate esters.
(b) An ethylene/α-olefin or ethylene/α-olefin/diene (EPDM) copolymer grafted with an unsaturated carboxylic anhydride such as maleic anhydride.
(c) A copolymer of ethylene, 2-isocyanatoethyl(meth) acrylate, and optionally one or more (meth)acrylate esters.
(d) a copolymer of ethylene and acrylic acid reacted with a Zn, Li, Mg or Mn compound to form the corresponding ionomer.

The polyamide composition used in the present invention may comprise the copolyamide alone or may optionally comprise additives. A preferred additive is at least one plasticizer. The plasticizer will preferably be miscible with the polyamide. Examples of suitable plasticizers include sulfonamides, preferably aromatic sulfonamides such as benzenesulfonamides and toluenesulfonamides. Examples of suitable sulfonamides include N-alkyl benzenesulfonamides and toluenesulfonamides, such as N-butylbenzenesulfonamide, N-(2-hydroxypropyl)benzenesulfonamide, N-ethyl-o-toluenesulfonamide; N-ethyl-p-toluenesulfonamide, o-toluenesulfonamide, p-toluenesulfonamide, and the like. Preferred are N-butylbenzenesulfonamide, N-ethyl-o-toluenesulfonamide, and N-ethyl-p-toluenesulfonamide.

The plasticizer may be incorporated into the composition by melt-blending the polymer with plasticizer and, optionally, other ingredients, or during polymerization. If the plasticizer is incorporated during polymerization, the polyamide monomers are blended with one or more plasticizers prior to starting the polymerization cycle and the blend is introduced to the polymerization reactor. Alternatively, the plasticizer can be added to the reactor during the polymerization cycle.

When used, the plasticizer will be present in the composition in about 1 to about 20 weight percent, or more preferably in about 6 to about 18 weight percent, or yet more preferably in about 8 to about 15 weight percent, wherein the weight percentages are based on the total weight of the composition.

The reinforcement agent may be any filler, but is preferably selected from the group consisting calcium carbonate, glass fibers with circular and noncircular cross-section, glass flakes, glass beads, carbon fibers, talc, mica, wollastonite, calcined clay, kaolin, diatomite, magnesium sulfate, magnesium silicate, barium sulfate, titanium dioxide, sodium aluminum carbonate, barium ferrite, potassium titanate and mixtures thereof.

Glass fibers with noncircular cross-section refer to glass fiber having a cross section having a major axis lying perpendicular to a longitudinal direction of the glass fiber and corresponding 10 the longest linear distance in the cross section. The non-circular cross section has a minor axis corresponding 10 the longest linear distance in the cross section in a direction perpendicular to the major axis. The non-circular cross section of the fiber may have a variety of shapes including a cocoon-type (figure-eight) shape, a rectangular shape; an elliptical shape; a roughly triangular shape; a polygonal shape; and an oblong shape. As will be understood by those skilled in the art, the cross section may have other shapes. The ratio of the length of the major axis to that of the minor access is preferably between about 1.5:1 and about 6:1. The ratio is more preferably between about 2:1 and 5:1 and yet more preferably between about 3:1 to about 4:1. Suitable glass fiber are disclosed in EP 0 190 001 and EP 0 196 194.

Preferred reinforcing agents include glass fibers and the minerals kaolin, clay, mica and talc. Glass fiber is a preferred reinforcing agent.

The polyamide composition used in the present invention may optionally comprise additional additives such as impact modifiers; thermal, oxidative, and/or light stabilizers; colorants; lubricants; mold release agents; and the like. Such additives can be added in conventional amounts according to the desired properties of the resulting material, and the control of these amounts versus the desired properties is within the knowledge of the skilled artisan.

When present, additives may be incorporated into the polyamide composition used in the present invention by melt-blending using any known methods. The component materials may be mixed to homogeneity using a melt-mixer such as a single or twin-screw extruder, blender, kneader, Banbury mixer, etc. to give a polyamide composition. Or, part of the materials may be mixed in a melt-mixer, and the rest of the materials may then be added and further melt-mixed until homogeneous.

Further provided is a method for providing a melt-blended thermoplastic composition comprising:
melt-blending
A) a polyamide composition comprising
  a) 55 to 90 weight percent semi-crystalline semi-aromatic copolyamide having a melting point; wherein said semi-aromatic copolyamide comprises
    a-1) about 15 to 50 mole percent, preferably 15 to 40 mole percent, aromatic repeal units derived from:
      i) one or more aromatic dicarboxylic acids with 8 to 20 carbon atoms and a first aliphatic diamine with 4 to 20 carbon atoms; and
    a-2) 50 to 85 mole percent, preferably 60 to 85 mole percent, aliphatic repeat units derived from:
      ii) an aliphatic dicarboxylic acid with 8 to 20 carbon atoms and said first aliphatic diamine with 4 to 20 carbon atoms; or
      iii) an aliphatic aminoacid or a lactam with 8 to 20 carbon atoms;
  b) 10 to 45 weight percent aliphatic homopolyamide having a melting point; wherein said aliphatic homopolyamide comprises repeat units derived from:
    iv) an aliphatic dicarboxylic acid with 8 to 20 carbon atoms and a second aliphatic diamine with 4 to 20 carbon atoms or
    v) an aliphatic aminoacid or a lactam with 8 to 20 carbon atoms; and
  wherein the weight percent of a) and b) are based on the total weight of a) and b); and said first and second aliphatic diamines can be the same or different;
B) 0 to 45 weight percent, preferably 10 to 40 weight percent, polymeric tougheners;
C) 0 to 20 weight percent, preferably 0 to 12 weight percent, plasticizers; and
D) 0 to 45 weight percent reinforcing agent;
wherein the weight percent of B), C), and D) are based on the total weight of the melt-blended thermoplastic composition; wherein the melt-blending is performed at a melt temperature above the melting point of said semi-crystalline semi-aromatic copolyamide and said aliphatic homopolyamide and less than or equal to about 290° C., and preferably less than or equal to 280° C., to provide said melt-blended thermoplastic composition; and wherein said melt-blend composition has a glass transition and has a tan delta peak (E"/E') value of 0.21 or lower at said glass transition. All the preferences and attributes disclosed herein recited for the melt-blended thermoplastic composition also apply to the method for providing a melt-blended thermoplastic composition.

The melt temperature means the highest temperature of the melt-blended thermoplastic composition during the melt-blending process, as determined at the end of the melt-blending process. Preferably the melt temperature is equal to or less than 290° C. and preferably less than equal to 280° C.

In another aspect, the present invention relates to a method for manufacturing an article by shaping the melt-mixed compositions. Examples of articles are films, laminates, filaments, fibers, monolayer tubes, hoses, pipes, multi-layer tubes, hoses and pipes with one or more layers formed from the above composition, and automotive parts including engine parts. By "shaping", it is meant any shaping technique, such as for example extrusion, injection molding, thermoform molding, compression molding, blow molding, filament spinning, sheet casting or film blowing. Preferably, the article is shaped by extrusion or injection molding.

The molded or extruded thermoplastic articles disclosed herein may have application in many vehicular, industrial and consumer product components that meet one or more of the following requirements: resistance against road salts, hydrolysis by water and coolants such as glycol solutions, fuels, alcohols, oils, chlorinated water; high impact resistance especially under cold environment; improved retention of mechanical properties at high temperatures such as automotive underhood temperatures; significant weight reduction (over conventional metals, for instance); and noise reduction allowing more compact and integrated design. Specific molded or extruded thermoplastic articles are selected from the group consisting of automotive coolant lines, fuel lines, oil lines, truck air brake tubes, radiator end tanks, engine mounts, torque rods, filaments used for industrial and consumer applications such as brushes and those used for paper machine belts, and sporting goods such as lamination layers for skis and ski boots.

The present invention is further illustrated by the following examples. It should be understood that the following examples are for illustration purposes only, and are not used to limit the present invention thereto.

Methods

Melt Blending

Melt blending was performed in a 25 mm W&P twin screw extruder with 9 barrel segments. The extruder was provided with twin screws that incorporated kneading and mixing elements in an upstream melting zone and a downstream melt blending zone. All the polymer pellets and additive powders were pre-blended and fed at the main feed port of the extruder at a rate of nominally 250 g/min. Barrels were heated to a desired temperature profile of 200° C. at the feed port to a temperature ranging from 240-250° C. at the front end. The screw rpm was generally 300. The melt was extruded through a two hole die and was pelletized into granules.

Molding Method

The pellets of melt blended compositions were molded into test pieces per ASTM D 638 for specification using a 180 ton Nissei Injection molding machine. The mold cavity included ASTM D638 type IV 3.2 mm thick tensile bars and type V 3.2 mm thick tensile bars. The barrel temperature profile was 220° C. at the feed port to 240° C. at the nozzle. Mold temperature was 70° C. The melt blended compositions were pre-dried at 65° C. overnight in a dehumidifying dryer to provide a moisture level of less than 0.05% that is suitable for molding. Molded bars were ejected from the cavity and stored in dry-as-molded condition in vacuum sealed aluminum foiled bags until ready for testing.

Tensile Test Method

Tensile properties at 23° C. were measured per ASTM D638 specification with Type IV bars using an Instron tensile tester model 4469. Crosshead speed was 50 mm/min. Tensile properties at 125° C. were measured using a heating oven installed on the test machine with grips located inside the oven. Shorter ASTM D638 type V bars were used to accommodate higher elongation inside the oven. Crosshead speed was 250 mm/min. Averages of 5 samples are listed in the Tables.

DSC Test Method

Herein melting points are as determined with differential scanning calorimetry (DSC) at a scan rate of 10° C./min in the first heating scan, wherein the melting point is taken at the maximum of the endothermic peak, and the heat of fusion in Joules/gram (J/g) is the area within the endothermic peak.

DMA Test Method

Dynamic mechanical analysis (DMA) test was done using TA instruments DMA Q800 equipment. Injection molded test bars nominally measuring 18 mm×12.5 mm×3.2 mm were used in single cantilever mode by clamping their one end. The bars were equilibrated to −140° C. for 3 to 5 minutes, and then DMA test was carried out with following conditions: temperature ramping up from −140° C. to +160° C. at a rate of 2 degrees C./min, sinusoidal mechanical vibration imposed at an amplitude of 20 micrometers and multiple frequencies of 100, 50, 20, 10, 5, 3 and 1 Hz with response at 1 Hz selected for determination of storage modulus (E') and loss modulus (E") as a function of temperature. Tan delta was computed by dividing the loss modulus (E") by the storage modulus (E').

Tube Extrusion & Burst Pressure Testing Method

Impact modified melt blended compositions comprising polymer tougheners were dried overnight in a dehumidifying dryer at 65° C. They were extruded into tubes measuring 8.3 mm OD×6.3 mm ID using a Davis Standard tube extrusion system. The system consisted of a 50 mm single screw extruder equipped with a tubing die, a vacuum sizing tank with a plate style calibrator, puller and cutter. Die with bushing of 15.2 mm (0.600 in) and a tip of 8.9 mm (0.350 in) was used. Calibrator was 8.3 mm (0.327 in). Extruder barrel temperature profile was 210° C. at the feed port increasing to about 230° C. at the die. Line speed was typically 4.6 m/min (15 ft/min). After establishing a stable process, tubing was cut to 30 cm long pieces and used for burst pressure measurements.

Tube burst pressure was measured using a manual hydraulic pump fitted with a pressure gauge. One end of the tube was attached to the pump using a Swagelok fitting, while the other end of the tube was capped off. The burst pressure was measured by manually raising the fluid pressure until failure. Burst pressure at 125° C. was measured similarly by positioning the tube in a heated air circulating oven and allowing it to equilibrate to temperature for several hours prior to testing. Averages of 3 samples are listed in the Tables.

Zinc Chloride Resistance Test

ASTM D1693, Condition A, provides a test method for determination of environmental stress-cracking of ethylene plastics in presence of surface active agents such as soaps, oils, detergents etc. This procedure was adapted for determining stress cracking resistance of the polyamide compositions to a 50% by weight aqueous solution of ZnCl2 as follows.

Rectangular test pieces measuring 37.5 mm×12 mm×3.2 mm were molded. A controlled nick was cut into the face of each molded bar as per the standard procedure, the bars were bent into U-shape with the nick facing outward, and positioned into brass specimen holders as per the standard procedure. At least five bars were used for each composition. The holders were positioned into large test tubes.

The test fluid used was 50 wt % zinc chloride solution prepared by dissolving anhydrous zinc chloride into water in 50:50 weight ratio. The test tubes containing specimen holders were filled with freshly prepared salt solution fully immersing the test pieces such that there was at least 12 mm of fluid above the top test piece. The test tubes were positioned upright in a circulating air oven maintained at 50° C. Test pieces were periodically examined for development of cracks over a period of either 24 hours of immersion followed by 24 hrs of dry-out under ambient conditions without wiping or continued immersion of up to 200 hours as indicated in the tables below. Time to first observation of failure in any of the test pieces was recorded.

Materials

PA610 refers to Zytel® RS3090 polyamide 610 made from 1,6-diaminohexane and 1,10-decanedioic acid having a melting point of 224° C., available from E.I. DuPont de Nemours and Company, Wilmington, Del., USA.

PA612 refers to Zytel® 158 NC010 resin, having a melting point of about 218° C., available from E. I. du Pont de Nemours and Company, Wilmington, Del.

PA1010 refers to polyamide resin made from 1,10-decanediamine and 1,10-decanedioic acid, having a melting point of about 203° C., available from E. I. du Pont de Nemours and Company, Wilmington, Del.

Preparations of Copolyamides

PA612/6T copolyamides with 15, 20, 25 and 30 mole % PA6T repeat units, were prepared in autoclaves as follows. Two sizes of autoclaves were employed, a small autoclave with 5 kg nominal polymer capacity and a large autoclave with 1200 kg nominal polymer capacity. PA612/6T 85/15 and 80/20 were prepared in the small autoclave and PA612/6T 75/25 and 70/30 were made in the larger autoclave.

The procedure for making PA 612/6T 85/15 copolyamide in the smaller autoclave was as follows.

Salt Preparation The autoclave was charged with dodecanedioic acid (2266 g), terephthalic acid (288 g), an aqueous solution containing 78 weight percent of hexamethylene diamine (1751 g), an aqueous solution containing 1 weight percent sodium hypophosphite (35 g), an aqueous solution containing 28 weight percent acetic acid (34 g), an aqueous solution containing 1 weight percent Carbowax 8000 (10 g), and water (2190 g).

Process Conditions: The autoclave agitator was set to 5 rpm and the contents were purged with nitrogen at 69 kPa (10 psi) for 10 min. The agitator was set to 50 rpm, the pressure control valve was set to 1.72 MPa (250 psi), and the autoclave was healed. The pressure reached 1.72 MPa at which point steam was vented to maintain the pressure at 1.72 MPa. The temperature of the contents was allowed to rise to 250° C. The pressure was then reduced to 0 psig over about 60 min. During this time, the temperature of the clave rose to 270° C. The autoclave pressure was reduced to 34.5 kPa (absolute) (5 psia) by applying vacuum and held there for 15 min. The autoclave was then pressurized with 480 kPa (70 psi) nitrogen and the molten polymer was cast from the autoclave. The collected polymer strands were quenched with cold water and pelletized.

The copolyamide obtained had an inherent viscosity (IV) of 1.16 dl/g; in this case, IV was measured on a 0.5% solution in m-cresol at 25° C.

For making other PA612/6T 80/20 composition, the quantities of dodecanedioic acid and terephthalic acid were adjusted to achieve the desired molar ratio.

The procedure for making PA 612/6T 75/25 in the larger autoclave was as follows.

Polyamide 612 salt solution of approximately 45 weight percent concentration was prepared from hexamethylene diamine and dodecanedioic acid in water and adjusted to a pH of 7.6±0.1. Polyamide 6T salt solution of approximately 25 weight percent was prepared from hexamethylene diamine and terephthalic acid in water and adjusted to a pH of 8.7±0.1. A 45 wt % polyamide 612 salt solution (1927 kg), a 25 wt % polyamide 6T salt solution (937 kg), 8300 g of an aqueous solution containing 80 weight percent hexamethylene diamine, 248 g of an aqueous solution containing 10 wt % of Carbowax 8000 and 3106 g of glacial acetic acid were charged to an evaporator. The salt solution was then concentrated to approximately 70 wt % and then charged into an autoclave. Sodium hypophosphite (34 g) dissolved in 3 liters of water was also added to the autoclave via additive pot. The salt solution in the autoclave was then heated while the pressure was allowed to rise to 1.72 MPa (250 psi) at which point steam was vented to maintain the pressure at 1.72 MPa and heating was continued until the temperature of the batch reached 250° C. The pressure was then reduced slowly to reach in the range of 55-69 kPa (absolute) (8-10 psia), while the batch temperature was allowed to further rise to 265-275° C. The pressure was then held around 69 kPa (absolute) (10 psia) and the temperature was held at 265-275° C. for about 20 min. Finally, the polymer melt was extruded into strands, cooled, and cut into pellets. The copolyamides had an IV in the range of 1.2 to 1.4.

For making other PA612/6T 70/30 composition, the quantities of polyamide 612 and polyamide 6T salt solutions were adjusted to achieve the desired acid molar ratio.

PA610/6T copolyamides having 20 mole percent and 40 mole percent PA6T repeat units were prepared in a 10 L size autoclaves as follows. PA610/6T 80/20

Salt Preparation: The 10 L autoclave was charged with sebacic acid (2028 g), terephthalic acid (416 g), an aqueous solution containing 78 weight percent of hexamethylene diamine (1880 g), an aqueous solution containing 1 weight percent sodium hypophosphite (35 g), an aqueous solution containing 28 weight percent acetic acid (30 g), an aqueous solution containing 1 weight percent Carbowax 8000 (10 g), and water (2180 g).

Process Conditions The autoclave agitator was set to 5 rpm and the contents were purged with nitrogen at 69 kPa (10 psi) for 10 min. The agitator was set to 50 rpm, the pressure control valve was set to 1.72 MPa (250 psi), and the autoclave was heated. The pressure reached 1.72 MPa at which point steam was vented to maintain the pressure at 1.72 MPa. The temperature of the contents was allowed to rise to 250° C. The pressure was then reduced to 0 prig over about 60 min. During this time, the temperature of the clave rose to 270° C. The autoclave pressure was reduced to 34.5 kPa (absolute) (5 psia) by applying vacuum and held there for 15 min. The autoclave was then pressurized with 480 kPa (70 psi) nitrogen and the molten polymer was cast from the autoclave. The collected polymer strands were quenched with cold water and pelletized.

The copolyamide obtained had an inherent viscosity (IV) of 1.17 dl/g; in this case IV was measured on a 0.5% solution in m-cresol at 25° C. The polymer had a melting point of 204° C., as measured by DSC.

PA610/6T 60/40

Salt Preparation: The 10 L autoclave was charged with sebacic acid (1557 g), terephthalic acid (852 g), an aqueous solution containing 78.4 weight percent of hexamethylene diamine (1914 g), an aqueous solution containing 1 weight percent sodium hypophosphite (35 g), an aqueous solution containing 28 weight percent acetic acid (30 g), an aqueous solution containing 1 weight percent Carbowax 8000 (10 g), and water (2165 g).

Process Conditions: The autoclave agitator was set to 5 rpm and the contents were purged with nitrogen at 69 kPa (10 psi) for 10 min. The agitator was set to 50 rpm, the pressure control valve was set to 2.07 MPa (300 psi), and the autoclave was heated. The pressure reached 2.07 MPa at which point steam was vented to maintain the pressure at 2.07 MPa. The temperature of the contents was allowed to rise to 260° C. The pressure was then reduced to 0 psig over about 45 min. During this time, the temperature of the clave rose to 285° C. The autoclave pressure was reduced to 34.5 kPa (absolute) (5 psia) by applying vacuum and held there for 30 min. The autoclave was then pressurized with 480 kPa (70 psi) nitrogen and the molten polymer was cast from the autoclave. The collected polymer strands were quenched with cold water and pelletized.

The copolyamide obtained had an inherent viscosity (IV) of 1.18 dl/g; in this case IV was measured on a 0.5% solution in m-cresol at 25° C. The polymer had a melting point of 243° C., as measured by DSC.

Polymer Tougheners

PT-1 refers to a linear low density polyethylene (LLDPE) with specific gravity of 0.918 and a melt index of 2 gm/10 min @ 190° C., commercially available as Exxon LLDPE 1002.09.

PT-2 refers to a maleic anhydride grafted LLDPE, available as Fusabond® MB226D resin, available from E.I. DuPont de Nemours and Company, Wilmington, Del., USA.

PT-3 refers to an ethylene-octene copolymer consisting of 72 weight percent ethylene and 28 weight percent 1-octene commercially available as Engage 8180 from Dow Chemicals.

PT-4 refers to a maleic anhydride grafted ethylene-octene copolymer, available as Fusabond® N493, available from E.I. DuPont de Nemours and Company, Wilmington, Del., USA.

PT-5 refers to a 0.9 wt % maleic anhydride grafted ethylene-propylene-norbornene consisting of ethylene, propylene and norbornene (70:29.5:0.5 weight ratio), commercially available as Nordel 3745P.

Additives

Akrochem 383 SWP refers to a hindered phenol antioxidant from Akron Chemicals.

Naugard 445 stabilizer refers to 4,4' di(.α,α-dimethylbenzyl)diphenylamine available commercially from Chemtura Chemical Company, Middlebury, Conn.

Irgafos 168 stabilizer is a phosphite anti-oxidant from BASF

HS 7:1:1 refers to a copper based heat stabilizer with 7:1:1 parts by weight of KI:CuI:Al distearate.

C-Black refers to a black masterbatch consisting of 45 weight percent carbon black in an ethylene/methacrylic acid copolymer available from Ampacet Corporation, Tarrytown, N.Y.

n-BBSA is n-butyl benzene sulfonamide plasticizer.

EXAMPLES

Tables 2 and 3 list the properties of aliphatic homopolyamides and semi-aromatic copolyamides used in the Examples.

TABLE 2

Properties of aliphatic homopolyamides

| Example | C1 | C2 | C3 | C4 |
|---|---|---|---|---|
| Aliphatic homopolyamide | PA 612 | PA 1010 | PA 610 | PA 12 |
| Tan Delta Peak Temp (° C.) | 52.8 | 53.1 | 48.4 | 47.3 |
| Tan Delta Peak Value | 0.11 | 0.16 | 0.13 | 0.14 |
| Storage Modulus @ 23° C. (Mpa) | 1988 | 1408 | 1887 | 1251 |
| Storage Modulus @ 125° C. (Mpa) | 362 | 215 | 329 | 168 |
| Tensile Modulus @ 23° C. (Mpa) | 2000 | 1600 | 1904 | 1386 |
| Tensile Modulus @ 125° C. (Mpa) | 286 | 161 | 329 | 145 |
| Yield Stress @ 23° C. (Mpa) | 58.5 | 51 | 63 | 44 |
| $ZnCl_2$ Resistance 50° C. (hrs - to first failure) | 3 | 174 | Not tested | No failure to 174 hrs |
| DSC 1st Melt Melting peak temperature (° C.) | 217 | 203 | 224 | 180 |
| DSC 1st Melt Heat of Fusion (J/g) | 65 | 58 | 62 | 59 |

TABLE 3

Properties of semi-aromatic copolyamides

| Example | C5 | C6 | C7 | C8 |
|---|---|---|---|---|
| PA 612/6T (85/15) | 100 | | | |
| PA 612/6T (80/20) | | 100 | | |
| PA 612/6T (75/25) | | | 98.5 | |
| PA 612/6T (70/30) | | | | 98.5 |
| AO additives* | | | 1.5 | 1.5 |
| Tan Delta Peak Temp (° C.) | 64 | 56 | 59 | 57 |
| Tan Delta Peak Value | 0.23 | 0.28 | 0.25 | 0.26 |
| Storage Modulus @ 23° C. (Mpa) | 1751 | 1674 | 1851 | 1716 |
| Storage Modulus @ 125° C. (Mpa) | 201 | 170 | 189 | 185 |
| Tensile Modulus @ 23° C. (Mpa) | 1723 | 1622 | 2075 | 2234 |
| Tensile Modulus @ 125° C. (Mpa) | Not tested | Not tested | 150 | 200 |
| Yield Stress @ 23° C. (Mpa) | 64 | 61 | 67 | 75 |
| $ZnCl_2$ Resistance @ 50° C. (hrs - to first failure) | Not tested | Not tested | No failure in 24 hrs immersion & 24 hr dryout | No failure in 162 hr immersion |
| DSC 1st Melt Melting peak temperature (° C.) | 202 | 199 | 198 | 197 |
| DSC 1st Melt Heat of Fusion (J/g) | 51 | 47 | 39 | 35 |

*Equal proportions of Naugard 445, Akrochem 383SWP & Irgafos 168

TABLE 4

PA 812/6T 75/25 and melt blended compositions with PA 612

| Example | C7 | E1 | E2 | E3 |
|---|---|---|---|---|
| PA 612/6T (75/25) (wt %) | 98.5 | 78.5 | 68.5 | 59 |
| PA 612 (wt %) | | 20 | 30 | 39.5 |
| AO additives* (wt %) | 1.5 | 1.5 | 1.5 | 1.5 |
| Tan Delta Peak Temp (° C.) | 59 | 64 | 64 | 62 |
| Tan Delta Peak Value | 0.25 | 0.21 | 0.19 | 0.18 |
| Storage Modulus @ 23° C. (Mpa) | 1851 | 1751 | 1819 | 1951 |
| Storage Modulus @ 125° C. (Mpa) | 189 | 184 | 202 | 228 |
| Tensile Modulus @ 23° C. (Mpa) | 2075 | 1910 | 2186 | 1965 |
| Tensile Modulus @ 125° C. (Mpa) | 150 | 180 | 189 | 201 |
| Yield Stress @ 23° C. (Mpa) | 67 | 70 | 72 | 72 |
| $ZnCl_2$ Resistance @ 50° C. (hrs - to first failure) | No failure in 24 hrs | 21 | 27 | 21 |
| DSC 1st Melt Melting peak temperature (° C.) | 198 | 208 | 213 | 215 |
| DSC 1st Melt Heat of Fusion (J/g) | 39 | 48 | 49 | 47 |

*Equal proportions of Naugard 445, Akrochem 383SWP & Irgafos 168

Melt blended compositions E1 to E3 show tan delta peak values below 0.21, improved high temperature modulus, and higher crystallinity in the blends versus the comparative example C7.

TABLE 5

PA 612/6T 70/30 and melt blended compositions with PA 612

| Example | C8 | E4 | E5 | E6 |
|---|---|---|---|---|
| PA 612/6T (70/30) (wt %) | 98.5 | 73.5 | 64 | 49.5 |
| PA 612 (wt %) | | 25 | 34.5 | 49 |
| AO additives* | 1.5 | 1.5 | 1.5 | 1.5 |
| Tan Delta Peak Temp (° C.) | 57 | 62 | 63.32 | 61.25 |
| Tan Delta Peak Value | 0.26 | 0.20 | 0.20 | 0.17 |
| Storage Modulus @ 23° C. (Mpa) | 1716 | 1595 | 1825 | 1810 |
| Storage Modulus @ 125° C. (Mpa) | 185 | 227 | 207 | 239 |
| Tensile Modulus @ 23° C. (Mpa) | 2234 | 1998 | 2013 | 2020 |

TABLE 5-continued

PA 612/6T 70/30 and melt blended compositions with PA 612

| Example | C8 | E4 | E5 | E6 |
|---|---|---|---|---|
| Tensile Modulus @ 125° C. (Mpa) | 200 | 238 | 254 | 255 |
| Yield Stress @ 23° C. (Mpa) | 75 | 77 | 76 | 76 |
| ZnCl$_2$ Resistance @ 50° C. (hrs - to first failure) | No failure in 162 hr | 45 | 21 | 21 |
| DSC 1st Melt Melting peak temperature (° C.) | 197 | 213 | 215 | 217 |
| DSC 1st Melt Heat of Fusion (J/g) | 35 | 42 | 42 | 49 |

*Equal proportions of Naugard 445, Akrochem 383SWP & Irgafos 168

Melt blended compositions E4 to E6 show tan delta peak values below 0.21, improved high temperature modulus, and higher crystallinity in the blends versus the comparative example C8.

Examples E7-E12

Examples E7-E12 show compositions prepared in a 25 mm twin screw extruder as described above, but with a barrel temperature profile of either 210-230° C. or 260-285° C. used from the feed hopper to the die resulting in a melt blending temperature of either below 260° C. or above 280° C. The resulting blends were analyzed by the dynamic mechanical analysis as shown in Table 6.

TABLE 6

Effect of melt blending temperature

| | Example | | | | | |
|---|---|---|---|---|---|---|
| | E7 | E8 | E9 | E10 | E11 | E12 |
| PA 612/6T (75/25) (wt %) | 68.9 | 68.9 | 59.1 | 59.1 | | |
| PA 12/6T (70/30) (wt %) | | | | | 64 | 64 |
| PA 612 (WT %) | 29.6 | 29.6 | 39.4 | 39.4 | 34.5 | 34.5 |
| AO additives* (wt %) | 1.5 | 1.5 | 1.5 | 1.5 | 1.5 | 1.5 |
| Melt temperature @ exit of extruder (° C.) | 247 | 282 | 249 | 286 | 255 | 287 |
| Tan Delta Peak Temp (° C.) | 61 | 66 | 62 | 65 | 62 | 64 |
| Tan Delta Peak Value | 0.17 | 0.20 | 0.16 | 0.20 | 0.17 | 0.19 |
| Storage Modulus @ 23° C. (Mpa) | 1380 | 1333 | 1527 | 1529 | 1401 | 1637 |
| Storage Modulus @ 125° C. (Mpa) | 206 | 186 | 220.6 | 208 | 212.9 | 207 |

*Equal proportions of Naugard 445, Akrochem 383SWP & Irgafos 168

Compositions E7, E9 and E11 made at melt temperature below 260° C. exhibit lower tan delta values and higher storage modulus at 125° C. compared to compositions E8, E10 and E12 respectively made at a melt temperature above 280° C.

TABLE 7

PA 612/6T (75/25) compositions including polymer tougheners.

| Example | C9 | E13 | E14 |
|---|---|---|---|
| PA 612/6T (75/25) (wt %) | 71.1 | 49.8 | 42.7 |
| PA 612 (wt %) | | 21.3 | 28.4 |
| PT-1 (wt %) | 12.5 | 12.5 | 12.5 |
| PT-2 (wt %) | 10 | 10 | 10 |
| PT-5 (wt %) | 2.5 | 2.5 | 2.5 |
| Additives* (wt %) | 3.9 | 3.9 | 3.9 |
| Tan Delta Peak Temp (° C.) | 59.6 | 61.0 | 60.7 |
| Tan Delta Peak Value | 0.24 | 0.19 | 0.18 |
| Storage Modulus @ 23° C. (Mpa) | 1127 | 1166 | 1180 |
| Storage Modulus @ 125° C. (Mpa) | 75.6 | 89 | 99.3 |
| Tensile Modulus @ 23° C. (Mpa) | 1231 | 1333 | 1353 |
| Tensile Modulus @ 125° C. (Mpa) | 51 | 76 | 89 |
| Yield Stress @ 23° C. (Mpa) | 41 | 42 | 43 |
| ZnCl$_2$ Resistance @ 50° C. (hrs - to first failure) | No failure in 192 hrs | No failure in 192 hrs | No failure in 192 hrs |
| 8.3 mm OD × 6.3 mm ID tubes | | | |
| Burst Pressure @ 23° C. (bars) | 114 | 115 | 109 |
| Burst Pressure @ 125° C. (bars) | 15 | 18 | 18 |

*0.5% Akrochem 383 SWP, 0.5% Naugard 445, 0.5% Irgafos 168, 0.4% HS 7:1:1, and 2% C-Black.

Melt blended compositions E13 and E14 show tan delta peak values below 0.21, and improved high temperature modulus, and better high temperature tube burst pressure, compared to C9.

TABLE 8

PA 612/6T (70/30) compositions including polymer tougheners

| Example | C10 | E15 |
|---|---|---|
| PA 612/6l (70/30) (wt %) | 71.1 | 46.2 |
| PA 612 (wt %) | | 24.9 |
| PT-1 (wt %) | 12.5 | 12.5 |
| PT-2 (wt %) | 10 | 10 |
| PT-5 (wt %) | 2.5 | 2.5 |
| Additives* (wt %) | 3.9 | 3.9 |
| Tan Delta Peak Temp (° C.) | 63.0 | 63.4 |
| Tan Delta Peak Value | 0.25 | 0.20 |
| Storage Modulus @ 23° C. (Mpa) | 1173 | 1211 |
| Storage Modulus @ 125° C. (Mpa) | 74 | 88 |
| Tensile Modulus @ 23° C. (Mpa) | 1266 | 1248 |
| Tensile Modulus @ 125° C. (Mpa) | 53 | 74 |
| Yield Stress @ 23° C. (Mpa) | 40 | 41 |
| ZnCl$_2$ Resistance @ 50° C. (hrs - to first failure) | No failure in 192 hrs | No failure in 192 hrs |

TABLE 8-continued

PA 612/6T (70/30) compositions including polymer tougheners

| Example | C10 | E15 |
|---|---|---|
| 8.3 mm OD × 6.3 mm ID tubes | | |
| Burst Pressure @ 23° C. (bars) | 110 | 115 |
| Burst Pressure @ 125° C. (bars) | 15 | 17 |

*0.5% Akrochem 383 SWP, 0.5% Naugard 445, 0.5% Irgafos 168, 0.4% HS 7:1:1, and 2% C-Black.

Melt blended compositions E15 shows tan delta peak values below 0.21, and improved high temperature modulus, and better high temperature tube burst pressure compared to C10.

TABLE 9

PA 612/6T (75/25) compositions including polymer tougheners

| Example | C11 | E16 | E17 |
|---|---|---|---|
| PA 612/6T (75/25) (wt %) | 57.1 | 49.8 | 42.7 |
| PA 612 | | 21.3 | 28.4 |
| PT-3 (wt %) | 19 | 19 | 19 |
| PT-4 (wt %) | 20 | 20 | 20 |
| Additives* (wt %) | 3.9 | 3.9 | 3.9 |
| Tan Delta Peak Temp (° C.) | 56 | 56 | 53 |
| Tan Delta Peak Value | 0.27 | 0.21 | 0.20 |
| Storage Modulus @ 23° C. (Mpa) | 651 | 682 | 645 |
| Storage Modulus @ 125° C. (Mpa) | 46 | 58.6 | 55.4 |
| Tensile Modulus @ 23° C. (Mpa) | 748 | 803 | 736 |
| Tensile Modulus @ 125° C. (Mpa) | 40.5 | 52.6 | 60.3 |
| Yield Stress @ 23° C. (Mpa) | 38 | 34 | 34 |
| $ZnCl_2$ Resistance @ 50° C. (hrs - to first failure) | No failure in 192 hrs | No failure in 192 hrs | No failure in 192 hrs |
| 8.3 mm OD × 6.3 mm ID tubes | | | |
| Burst Pressure @ 23° C. (bars) | 54 | 59 | 56 |
| Burst Pressure @ 125° C. (bars) | 9 | 10 | 10 |

*0.5% Akrochem 383 SWP, 0.5% Naugard 445, 0.5% Irgafos 168, 0.4% HS 7:1:1, and 2% C-Black.

Melt blended compositions E16 and E17 show tan delta peak values equal to or below 0.21, and improved high temperature modulus, and better high temperature tube burst pressure compared to C11.

TABLE 10

PA 612/6T (70/30) compositions including polymer tougheners.

| Example | C12 | E18 |
|---|---|---|
| PA 612/6T (70/30) | 57.1 | 37.1 |
| PA 612 (wt %) | | 20 |
| PT-3 (wt %) | 19 | 19% |
| PT-4 (wt %) | 20 | 20 |
| Additives* | 3.9 | 3.9 |
| Tan Delta Peak Temp (° C.) | 53.8 | 56.9 |
| Tan Delta Peak Value | 0.30 | 0.21 |
| Storage Modulus @ 23° C. (Mpa) | 588 | 639 |
| Storage Modulus @ 125° C. (Mpa) | 42.3 | 55.1 |
| Tensile Modulus @ 23° C. (Mpa) | 758 | 767 |
| Tensile Modulus @ 125° C. (Mpa) | 36 | 50 |
| Yield Stress @ 23° C. (Mpa) | 38 | 31 |
| $ZnCl_2$ Resistance @ 50° C. (hrs - to first failure) | No failure in 192 hrs | No failure in 192 hrs |
| 8.3 mm OD × 6.3 mm ID tubes | | |
| Burst Pressure @ 23° C. (bars) | 52.4 | 61.2 |
| Burst Pressure @ 125° C. (bars) | 8.5 | 10.5 |

*0.5% Akrochem 383 SWP, 0.5% Naugard 445, 0.5% Irgafos 168, 0.4% HS 7:1:1, and 2% C-Black.

Melt blended compositions E18 shows tan delta peak value of 0.21, and improved high temperature modulus, and better high temperature tube burst pressure compared to C12.

TABLE 11

PA 612/6T (75/25) compositions including polymer tougheners

| Example | C13 | E19 | E20 |
|---|---|---|---|
| PA 612/6T (75/25) (wt %) | 57.1 | 40 | 34.3 |
| PA 612 (wt %) | | 17.1 | 22.8 |
| PT-1 (wt %) | 22.5 | 22.5 | 22.5 |
| PT-2 (wt %) | 16.5 | 16.5 | 16.5 |
| Additives* | 3.9 | 3.9 | 3.9 |
| Tan Delta Peak Temp (° C.) | 56 | 58 | 55 |
| Tan Delta Peak Value | 0.23 | 0.20 | 0.20 |
| Storage Modulus @ 23° C. (Mpa) | 946 | 965 | 952 |
| Storage Modulus @ 125° C. (Mpa) | 41 | 53 | 56 |
| Tensile Modulus @ 23° C. (Mpa) | 1042 | 1122 | 1120 |
| Tensile Modulus @ 125° C. (Mpa) | 47 | 66 | 64 |
| Yield Stress @ 23° C. (Mpa) | 34 | 36 | 35 |
| $ZnCl_2$ Resistance @ 50° C. (hrs - to first failure) | No failure in 192 hrs | No failure in 192 hrs | No failure in 192 hrs |
| 8.3 mm OD × 6.3 mm ID tubes | | | |
| Burst Pressure @ 23° C. (bars) | 77 | 94 | 92 |
| Burst Pressure @ 125° C. (bars) | 8 | 11 | 11 |

*0.5% Akrochem 383 SWP, 0.5% Naugard 445, 0.5% Irgafos 168, 0.4% HS 7:1:1, and 2% C-Black.

Melt blended compositions E19 and E20 show tan delta peak values below 0.21, and improved high temperature modulus, and better high temperature tube burst pressure compared to C13.

TABLE 12

PA 612/6T (70/30) compositions including polymer tougheners

| Example | C14 | E21 |
|---|---|---|
| PA 612/6T (70/30) | 57.1 | 37.1 |
| PA 612 (wt %) | | 20 |
| PT-1 (wt %) | 22.5 | 22.5 |
| PT-2 (wt %) | 16.5 | 16.5 |
| Additives* | 3.9 | 3.9 |
| Tan Delta Peak Temp (° C.) | 56 | 60 |
| Tan Delta Peak Value | 0.25 | 0.20 |
| Storage Modulus @ 23° C. (Mpa) | 919 | 912 |
| Storage Modulus @ 125° C. (Mpa) | 39 | 50 |
| Tensile Modulus @ 23° C. (Mpa) | 1055 | 1076 |
| Tensile Modulus @ 125° C. (Mpa) | 50 | 57 |
| Yield Stress @ 23° C. (Mpa) | 34 | 35 |
| ZnCl$_2$ Resistance @ 50° C. (hrs - to first failure) | No failure in 192 hrs | No failure in 192 hrs |
| 8.3 mm OD × 6.3 mm ID tubes | | |
| Burst Pressure @ 23 C. (bars) | 86 | 100 |
| Burst Pressure @ 125 C. (bars) | 9 | 11 |

*0.5% Akrochem 383 SWP, 0.5% Naugard 445, 0.5% Irgafos 168, 0.4% HS 7:1:1, and 2% C-Black.

Melt blended compositions E21 shows tan delta peak values below 0.21, and improved high temperature modulus, and better high temperature tube burst pressure compared to C14.

Table 13 lists the jproperties of semiaromatic copolyamides PA 610/6T at various molar ratios.

TABLE 13

Properties of PA 610/6T semi-aromatic copolyamides

| Example | C15 | C16 | C17 |
|---|---|---|---|
| PA 610/6T (80/20) | 96.1 | | |
| PA 610/6T (60/40) | | 100 | |
| PA 610/6T (85/15) | | | 100 |
| AO additives* (wt %) | 3.9 | | |
| Tan Delta Peak Temp (° C.) | 63 | 63.4 | 63.2 |
| Tan Delta Peak Value | 0.25 | 0.25 | 0.26 |
| Storage Modulus @ 23° C. (Mpa) | 1766 | 1481 | 1755 |
| Storage Modulus @ 125° C. (Mpa) | 195 | 201 | 221 |
| Tensile Modulus @ 23° C. (Mpa) | 1784 | 2194 | 1754 |
| Tensile Modulus @ 125° C. (Mpa) | 161 | Not tested | Not tested |
| Yield Stress @ 23° C. (Mpa) | 62.9 | 85.2 | 64.8 |
| ZnCl$_2$ Resistance @ 50° C. (hrs - to first failure) | 30 hrs | 216 hrs | Not tested |
| DSC 1st Melt Melting peak temperature (° C.) | 199.7 | 243.5 | 207 |
| DSC 1st Melt Heat of Fusion (J/g) | 43.4 | 34 | 50 |

*0.5% Akrochem 383 SWP, 0.5% Naugard 445, 0.5% Irgafos 168, 0.4% HS 7:1:1, and 2% C-Black

TABLE 14

PA 610/6T (80/20) and melt blended compositions with PA 1010

| Example | C15 | E22 |
|---|---|---|
| PA 610/6T (80/20) (wt %) | 96.1 | 72.1 |
| PA 1010 (wt %) | | 24 |
| AO additives* (wt %) | 3.9 | 3.9 |
| Tan Delta Peak Temp (° C.) | 63 | 63.3 |
| Tan Delta Peak Value | 0.25 | 0.20 |
| Storage Modulus @ 23° C. (Mpa) | 1766 | 1577 |
| Storage Modulus @ 125° C. (Mpa) | 195 | 198 |
| Tensile Modulus @ 23° C. (Mpa) | 1784 | 1876 |
| Tensile Modulus @ 125° C. (Mpa) | 161 | 184 |
| Yield Stress @ 23° C. (Mpa) | 62.9 | 64.9 |
| ZnCl$_2$ Resistance @ 50° C. (hrs - to first failure) | 30 hrs | 30 hrs |
| DSC 1st Melt Melting peak temperature (° C.) | 199.7 | 200 |
| DSC 1st Melt Heat of Fusion (J/g) | 43.4 | 48.6 |

*0.5% Akrochem 383 SWP, 0.5% Naugard 445, 0.5% Irgafos 168, 0.4% HS 7:1:1, and 2% C-Black Melt blended compositions E22 shows tan delta peak value below 0.21, improved high temperature modulus, and higher crystallinity in the blend versus the comparative example C15.

TABLE 15

PA 610/6T (60/40) and melt blended compositions with PA 610, PA 1010 & PA 612

| Example | C16 | E23 | E24 | E25 |
|---|---|---|---|---|
| PA 610/6T (60/40) (wt %) | 100 | 73.5 | 68.5 | 68.5 |
| PA 610 (wt %) | | 25 | | |
| PA 1010 (wt %) | | | 30 | |
| PA 612 (wt %) | | | | 30 |
| AO additives* (wt %) | | 1.5 | 1.5 | 1.5 |
| Tan Delta Peak Temp (° C.) | 63.4 | 64.1 | 62.2 | 64.5 |
| Tan Delta Peak Value | 0.25 | 0.19 | 0.19 | 0.17 |
| Storage Modulus @ 23° C. (Mpa) | 1481 | 1690 | 1802 | 1660 |
| Storage Modulus @ 125° C. (Mpa) | 201 | 251 | 254 | 231 |

TABLE 15-continued

PA 610/6T (60/40) and melt blended compositions with PA 610, PA 1010 & PA 612

| Example | C16 | E23 | E24 | E25 |
|---|---|---|---|---|
| Tensile Modulus @ 23° C. (Mpa) | 2194 | 2227 | 2191 | 2144 |
| Tensile Modulus @ 125° C. (Mpa) | Not tested | 279 | 283 | 270 |
| Yield Stress @ 23° C. (Mpa) | 85.2 | 83.8 | 79.9 | 80.7 |
| $ZnCl_2$ Resistance @ 50° C. (hrs - to first failure) | 216 hrs | 17 hrs | >186 hrs | 49 hrs |
| DSC 1st Melt Melting peak temperature (° C.) | 243.5 | Not tested | Not tested | Not tested |
| DSC 1st Melt Heat of Fusion (J/g) | 34 | Not tested | Not tested | Not tested |

*0.5% Akrochem 383 SWP, 0.5% Naugard 445, 0.5% Irgafos 168

Melt blended compositions E23, E24 and E25 show tan delta peak value below 0.21 and improved high temperature modulus versus the comparative example C16.

TABLE 16

PA 610/6T (80/20) compositions including polymer tougheners.

| Example | C18 | E26 |
|---|---|---|
| PA 610/6T (80/20) (wt %) | 71.1 | 53.3 |
| PA 1010 (wt %) |  | 17.8 |
| PT-3 (wt %) | 12.5 | 12.5 |
| PT-4 (wt %) | 12.5 | 12.5 |
| Additives* (wt %) | 3.9 | 3.9 |
| Tan Delta Peak Temp (° C.) | 59.2 | 57.9 |
| Tan Delta Peak Value | 0.26 | 0.21 |
| Storage Modulus @ 23° C. (Mpa) | 956 | 965 |
| Storage Modulus @ 125° C. (Mpa) | 96 | 99 |
| Tensile Modulus @ 23° C. (Mpa) | 1076 | 1044 |
| Tensile Modulus @ 125° C. (Mpa) | 66 | 79 |
| Yield Stress @ 23° C. (Mpa) | 33 | 32 |
| $ZnCl_2$ Resistance @ 50° C. (hrs - to first failure) | 54 hrs | 77 hrs |
| Burst Pressure @ 23° C. (bars) 8.3 mm OD × 6.3 mm ID tube | 78 | 81 |

*0.5% Akrochem 383 SWP, 0.5% Naugard 445, 0.5% Irgafos 168, 0.4% HS 7:1:1, and 2% C-Black.

Melt blended compositions E26 shows tan delta peak value of 0.21 and improved high temperature modulus.

TABLE 17

Compositions of PA 612/6T (75/25) including polymer tougheners and plasticizers.

| Example | C19 | E27 | C20 | E28 |
|---|---|---|---|---|
| PA 612/6T (75/25) (wt %) | 65.1 | 45.6 | 74.9 | 52.6 |
| PA 612 (wt %) |  | 19.5 |  | 22.5 |
| n-BBSA | 6 | 6 | 6 | 6 |
| PT-3 (wt %) | 12.5 | 12.5 | 7.5 | 7.5 |
| PT-4 (wt %) | 12.5 | 12.5 | 7.5 | 7.5 |
| Additives* (wt %) | 3.9 | 3.9 | 3.9 | 3.9 |
| Nucleant (talc) (wt %) | 0.2 |  | 0.2 |  |
| Tan Delta Peak Temp (° C.) | Not tested | 44 | Not tested | 45 |
| Tan Delta Peak Value | Not tested | 0.15 | Not tested | 0.16 |
| Storage Modulus @ 23° C. (Mpa) | Not tested | 729 | Not tested | 991 |
| Storage Modulus @ 125° C. (Mpa) | Not tested | 83 | Not tested | 114 |
| Tensile Modulus @ 23° C. (Mpa) | 725 | 706 | 1010 | 988 |
| Tensile Modulus @ 125° C. (Mpa) | 50 | 60 | 55 | 86 |
| Yield Stress @ 23° C. (Mpa) | 25 | 25 | 29. | 31 |
| Burst Pressure @ 23° C. (bars) 8.3 mm OD × 6.3 mm ID tubes | 84 | 81 | 79 | 96 |
| Burst Pressure @ 125° C. (bars) 8.3 mm OD × 6.3 mm ID tubes | 11 | 13 | 14 | 17 |

*0.5% Akrochem 383 SWP, 0.5% Naugard 445, 0.5% Irgafos 168, 0.4% HS 7:1:1, and 2% C-Black Melt blended compositions E27 and E28 show improved high temperature modulus, and better high temperature tube burst pressure, compared to C19 and C20 respectively.

TABLE 18

Compositions of PA 610/6T (80/20) including polymer tougheners and plasticizers

| Example | C21 | E29 |
|---|---|---|
| PA 610/6T (80/20) (wt %) | 62.1 | 46.6 |
| PA 1010 (wt %) |  | 15.5 |
| n-BBSA | 9 | 9 |
| PT-3 (wt %) | 12.5 | 12.5 |
| PT-4 (wt %) | 12.5 | 12.5 |
| Additives* (wt %) | 3.9 | 3.9 |
| Tan Delta Peak Temp (° C.) | 29 | 25.1 |
| Tan Delta Peak Value | 0.18 | 0.17 |
| Storage Modulus @ 23° C. (Mpa) | 427 | 423 |
| Storage Modulus @ 125° C. (Mpa) | 61 | 66 |
| Tensile Modulus @ 23° C. (Mpa) | 372 | 385 |
| Tensile Modulus @ 125° C. (Mpa) | 44 | 49 |
| Yield Stress @ 23° C. (Mpa) | 19 | 20 |

TABLE 18-continued

Compositions of PA 610/6T (80/20) including
polymer tougheners and plasticizers

| Example | C21 | E29 |
|---|---|---|
| Burst Pressure @ 23° C. (bars) 8.3 mm OD × 6.3 mm ID tubes | 60 | 62 |
| Burst Pressure @ 125° C. (bars) 8.3 mm OD × 6.3 mm ID tubes | 8 | 12 |

*0.5% Akrochem 383 SWP, 0.5% Naugard 445, 0.5% Irgafos 168, 0.4% HS 7:1:1, and 2% C-Black While both compositions C21 and E29 show tan delta peak values below 0.21 when plasticizer is present, melt blended composition E29 shows improved high temperature modulus, and better high temperature tube burst pressure, compared to C21.

We claim:

1. A melt-blended thermoplastic composition comprising
A) a polyamide composition comprising
   a) 55 to 90 weight percent semi-crystalline semi-aromatic copolyamide having a melting point; wherein said semi-aromatic copolyamide comprises
      a-1) about 15 to 50 mole percent aromatic repeat units derived from:
         i) one or more aromatic dicarboxylic acids with 8 to 20 carbon atoms and a first aliphatic diamine with 4 to 20 carbon atoms;
         and
      a-2) 50 to 85 mole percent aliphatic repeat units derived from:
         ii) a first aliphatic dicarboxylic acid with 8 to 20 carbon atoms and said first aliphatic diamine with 4 to 20 carbon atoms; or
         iii) a first aliphatic aminoacid or lactam with 8 to 20 carbon atoms;
      wherein the semi-aromatic copolyamide has a DMA tan delta peak value of greater than or equal to 0.23; and heat of fusion of at least 20 J/g as measured in first heat cycle of DSC;
   b) 10 to 45 weight percent aliphatic homopolyamide having a melting point; wherein said aliphatic homopolyamide comprises repeat units derived from:
      iv) a second aliphatic dicarboxylic acid with 8 to 20 carbon atoms and a second aliphatic diamine with 4 to 20 carbon atoms or
      v) a second aliphatic aminoacid or lactam with 8 to 20 carbon atoms; and wherein the aliphatic homopolyamide has a DMA tan delta peak value of less than or equal to 0.21; and heat of fusion of at least 30 J/g as measured in first heat cycle of DSC;
   wherein the weight percent of a) and b) are based on the total weight of a) and b); and said first and second aliphatic diamines can be the same or different;
B) 0 to 45 weight percent polymeric toughener;
C) 0 to 20 weight percent, preferably 0 to 12 weight percent, plasticizers; and
D) 0 to 45 weight percent reinforcing agent;
wherein the weight percent of B), C), and D) are based on the total weight of the melt-blended thermoplastic composition; and wherein said melt-blend composition has a glass transition and has a tan delta peak (E"/E') value of 0.21 or lower at said glass transition.

2. The melt-blended thermoplastic composition of claim 1 wherein the semi-crystalline semi-aromatic copolyamide is selected from the group consisting of: PA 612/6T (85/15) to (55/45); PA 610/6T (85/15) to (55/45); PA1010/10T (85/15) to (55/45); PA 612/6I (90/10) to (70/30); and PA 612/6T/6I having a mole percent of 6T+6I of from 15 to 45 mol percent and the ratio of T to I is about 4:1 to 1:1.

3. The melt-blended thermoplastic composition of any one of the previous claims wherein said aliphatic homopolyamide is selected from the group consisting of PA 612, PA 610, PA1010, and PA 614.

4. The melt-blended thermoplastic composition of claim 1 wherein the semi-crystalline semi-aromatic copolyamide is PA 612/6T (85/15) to (55/45), and said aliphatic homopolyamide is PA 612.

5. The melt-blended thermoplastic composition of claim 1 wherein the semi-crystalline semi-aromatic copolyamide is PA 610/6T (85/15) to (55/45), and said aliphatic homopolyamide is PA 610.

6. The melt-blended thermoplastic composition of claim 1 wherein the semi-crystalline semi-aromatic copolyamide is PA 610/6T (85/15) to (55/45), and said aliphatic homopolyamide is PA 1010.

7. A method for providing a melt-blended thermoplastic composition comprising:
melt-blending
A) a polyamide composition comprising
   a) 55 to 90 weight percent semi-crystalline semi-aromatic copolyamide having a melting point; wherein said semi-aromatic copolyamide comprises
      a-1) about 15 to 50 mole percent, preferably 15 to 40 mole percent, aromatic repeat units derived from:
         i) one or more aromatic dicarboxylic acids with 8 to 20 carbon atoms and a first aliphatic diamine with 4 to 20 carbon atoms;
         and
      a-2) 50 to 85 mole percent, preferably 60 to 85 mole percent, aliphatic repeat units derived from:
         ii) an aliphatic dicarboxylic acid with 8 to 20 carbon atoms and said first aliphatic diamine with 4 to 20 carbon atoms; or
         iii) an aliphatic aminoacid or a lactam with 8 to 20 carbon atoms;
   b) 10 to 45 weight percent aliphatic homopolyamide having a melting point; wherein said aliphatic homopolyamide comprises repeat units derived from:
      iv) an aliphatic dicarboxylic acid with 8 to 20 carbon atoms and a second aliphatic diamine with 4 to 20 carbon atoms or
      v) an aliphatic aminoacid or a lactam with 8 to 20 carbon atoms; and
   wherein the weight percent of a) and b) are based on the total weight of a) and b); and said first and second aliphatic diamines can be the same or different;
B) 0 to 45 weight percent polymeric toughener;
C) 0 to 20 weight percent, preferably 0 to 12 weight percent, plasticizers; and
D) 0 to 45 weight percent reinforcing agent;
wherein the weight percent of B), C), and D) are based on the total weight of the melt-blended thermoplastic composition; and wherein the melt-blending is performed at a melt temperature above the melting point of said semi-crystalline semi-aromatic copolyamide and said aliphatic homopolyamide and less than or equal to about 290° C.; to provide the melt-blended thermoplastic composition, and wherein said melt-blend composition has a glass transition and has a tan delta peak (E"/E') value of 0.21 or lower at said glass transition.

8. The method of claim 7 wherein the semi-crystalline semi-aromatic copolyamide is selected from the group consisting of: PA 612/6T (85/15) to (55145); PA 610/6T (85/15) to (55/45); PA1010/10T (85/15) to (55/45); PA 612/6I (90/10) to (70/30); and PA 612/6T/6I having a mole percent of 6T+6I of from 15 to 45 mol percent and the ratio of T to I is about 4:1 to 1:1.

9. The method of any one of claims 7-8 wherein said aliphatic homopolyamide is selected from the group consisting of PA 612, PA 610, PA1010, and PA 614.

10. The method of any one of claims 7-8 wherein the semi-crystalline semi-aromatic copolyamide is PA 612/6T (85/15) to (55/45), and said aliphatic homopolyamide is PA 612.

11. The method of any one of claims 7-8 wherein the semi-crystalline semi-aromatic copolyamide is PA 610/6T (85/15) to (55/45), and said aliphatic homopolyamide is PA 610.

12. The method any one of claims 7-8 wherein the semi-crystalline semi-aromatic copolyamide is PA 610/6T (85/15) to (55/45), and said aliphatic homopolyamide is PA 1010.

* * * * *